United States Patent [19]

Tatge et al.

[11] Patent Number: 4,830,642
[45] Date of Patent: May 16, 1989

[54] FILTER SYSTEM WITH IN SITU CLEANING OF AN OPERATING FILTER UNIT

[75] Inventors: Robert J. Tatge, Palos Verdes Estates; Thomas E. Pfenning, Newport Beach, both of Calif.

[73] Assignee: CV International, Inc., Torrance, Calif.

[21] Appl. No.: 159,537

[22] Filed: Feb. 19, 1988

[51] Int. Cl.⁴ .................. B01D 29/02; B01D 29/06
[52] U.S. Cl. ............................... 55/273; 55/283; 55/285; 55/302; 210/333.1; 210/413
[58] Field of Search .............. 55/273, 283, 285, 290, 55/302, 401; 210/325, 333.1, 412–415

[56] References Cited

U.S. PATENT DOCUMENTS

| | | | |
|---|---|---|---|
| 1,002,618 | 9/1911 | Winkler | 55/290 |
| 1,836,920 | 12/1931 | Harrington | 55/290 |
| 2,103,483 | 12/1937 | McNeal | 210/333.1 X |
| 2,322,548 | 6/1943 | Sigmund . | |
| 2,407,722 | 9/1946 | Peterson | 55/285 |
| 2,594,957 | 4/1952 | Martens, Jr. . | |
| 2,823,656 | 2/1958 | Dolza | 123/119 |
| 3,107,987 | 10/1963 | Duer | 55/194 |
| 3,251,175 | 5/1966 | Black, Jr. | 55/302 X |
| 3,330,591 | 4/1968 | Muller | 210/333.1 X |
| 3,343,342 | 9/1967 | Rocher | 210/414 X |
| 3,360,907 | 1/1968 | Clark, Jr. et al. | 55/283 |
| 3,402,881 | 9/1968 | Moore et al. | 55/283 X |
| 3,500,614 | 3/1970 | Soo | 55/290 X |
| 3,606,735 | 9/1971 | Baigas, Jr. | 55/273 |
| 3,716,971 | 2/1973 | Reinauer | 55/96 |
| 3,936,902 | 2/1976 | Shackleton et al. | 55/302 X |
| 4,203,738 | 5/1980 | Kerman | 55/287 |
| 4,266,953 | 5/1981 | Matthys et al. | 55/283 X |
| 4,293,320 | 10/1981 | Robinson | 55/273 |
| 4,303,423 | 12/1981 | Camplin et al. | 55/337 |
| 4,331,459 | 5/1982 | Copley | 55/302 |
| 4,430,220 | 2/1984 | Litzenburger | 210/333.1 |
| 4,482,365 | 11/1984 | Roach | 55/283 X |
| 4,514,193 | 4/1985 | Booth | 55/290 |
| 4,622,050 | 11/1986 | O'Connor | 55/283 |

FOREIGN PATENT DOCUMENTS

| | | | |
|---|---|---|---|
| 545523 | 3/1932 | Fed. Rep. of Germany | 55/302 |
| 554893 | 7/1932 | Fed. Rep. of Germany | 55/290 |
| 1295458 | 12/1962 | France | 55/290 |
| 9181 | 1/1977 | Japan | 55/302 |
| 25362 | 11/1931 | Netherlands | 210/413 |
| 2181669 | 4/1987 | United Kingdom | 55/290 |

*Primary Examiner*—Robert Spitzer
*Attorney, Agent, or Firm*—Shapiro and Shapiro

[57] ABSTRACT

A filter system comprises a filter unit and a cleaning unit which cleans the filter unit while the filter unit is operating normally. The filter unit is compartmentalized. During cleaning, an individual compartment is isolated between a pair of ducts of the cleaning unit and is cleaned by applying pulses of a cleaning fluid to one of the ducts and suction to the other duct. The filter unit is rotatable relative to the cleaning unit to align successive compartments of the filter unit with the cleaning unit.

9 Claims, 3 Drawing Sheets

FILTER SYSTEM WITH IN SITU CLEANING OF AN OPERATING FILTER UNIT

BACKGROUND OF THE INVENTION

This invention is concerned with filter systems, and more particularly with filter systems having a filter unit that is cleaned without interrupting the normal operation of the filter unit.

In most cases cleaning of a filter, such as an air filter at the intake manifold of an automobile engine, requires that the normal operation of the filter be interrupted. There are circumstances, however, when interruption of the normal operation of the filter is intolerable—for example, when continuous operation of an engine in dust-laden air is necessary, or when frequent filter cleaning is required due to operation of the engine in heavily dust-laden air. Moreover, filters tend to become loaded with intercepted (filtered) material, creating an increase in the pressure difference across the filter, and hence a loss of engine power. The more highly efficient the filter medium, the greater is the percentage of airborne contaminant material collected, and the higher the engine power loss in a given period of time. Reducing the filter medium efficiency is not an appropriate answer to this problem, however, because the resulting increase in airborne contaminant ingested by the engine can cause engine power loss and damage and shorten engine performance life. To avoid the foregoing problems, cleaning of a filter in situ, without interrupting the normal operation of the filter, is highly desirable.

BRIEF DESCRIPTION OF THE INVENTION

The present invention provides an improved filter system in which a highly efficient filter is thoroughly and efficiently cleaned in situ without interrupting the normal operation of the filter, and in which the frequency of filter cleaning is sufficient to prevent high pressure difference across the filter medium and to avoid serious degradation of engine performance.

In one of its broader aspects, a filter system in accordance with the invention comprises a filter unit and a cleaning unit, the filter unit including a series of filter compartments, each compartment defining a fluid flow path between a pair of spaced compartment openings, the flow path of each compartment being separated from the flow paths of the other compartments. The cleaning unit is disposed for selective alignment with each compartment of the filter unit, includes a pair of ducts disposed for communication with the openings, respectively, of a selected compartment, has means for forming a seal around the perimeter of the respective openings, and has means for causing cleaning fluid to flow from one of the ducts through the selected compartment to the other of the ducts, thereby cleaning the selected compartment while the remaining compartments continue to operate normally. The system also comprises means for causing relative movement between the filter unit and the cleaning unit to align the cleaning unit with different compartments of the filter unit.

BRIEF DESCRIPTION OF THE DRAWINGS

The invention will be further described in conjunction with the accompanying drawings illustrating preferred (best mode) embodiments, and wherein.

DETAILED DESCRIPTION OF PREFERRED EMBODIMENTS

Figure 1:
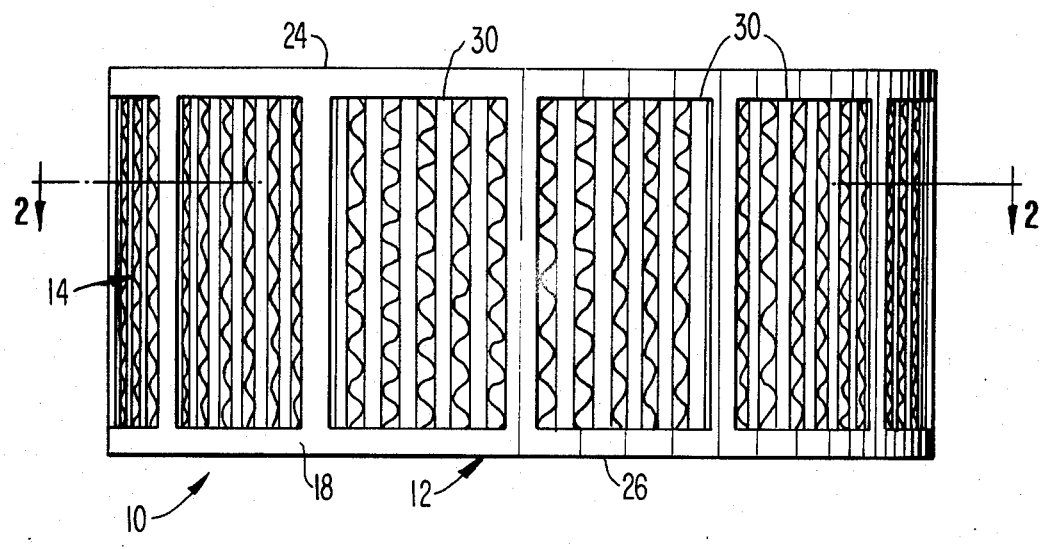
FIG. 1 is a side elevation view of a filter unit that may be employed in the invention.
Figure 2:
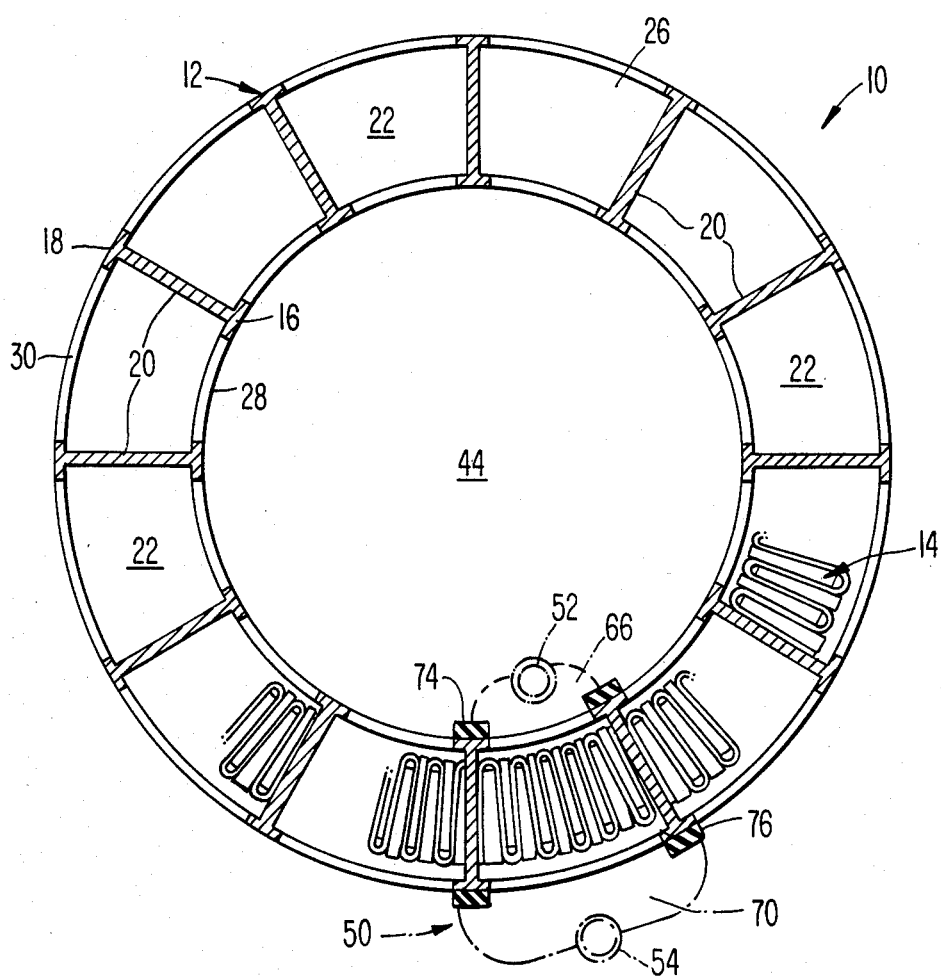
FIG. 2 is a partly diagrammatic horizontal sectional view, taken along line 2—2 in FIG. 1, illustrating the association of the filter unit with a cleaning unit (shown in phantom lines)

As shown in FIGS. 1 and 2 of the drawings, a filter unit 10 that may be employed in accordance with the invention is cylindrical and comprises a frame 12 and a barrier-type filter medium 14. The frame has a pair of spaced inner and outer walls 16 and 18, and the space between the walls is divided by a plurality of impervious partitions 20 so as to provide a series of separate compartments 22, the top and bottom of which are closed by top and bottom walls 24 and 26 of the frame. Each compartment 22 contains a filter medium 14 and has inner and outer openings 28 and 30 through the inner and outer walls 16 and 18, respectively. Each compartment defines between its inner and outer openings 28 and 30 a flow path that is separated from the flow paths of the other compartments. In the preferred embodiment, the filter medium is pleated, but other types of filter media may be employed.

Figure 3:
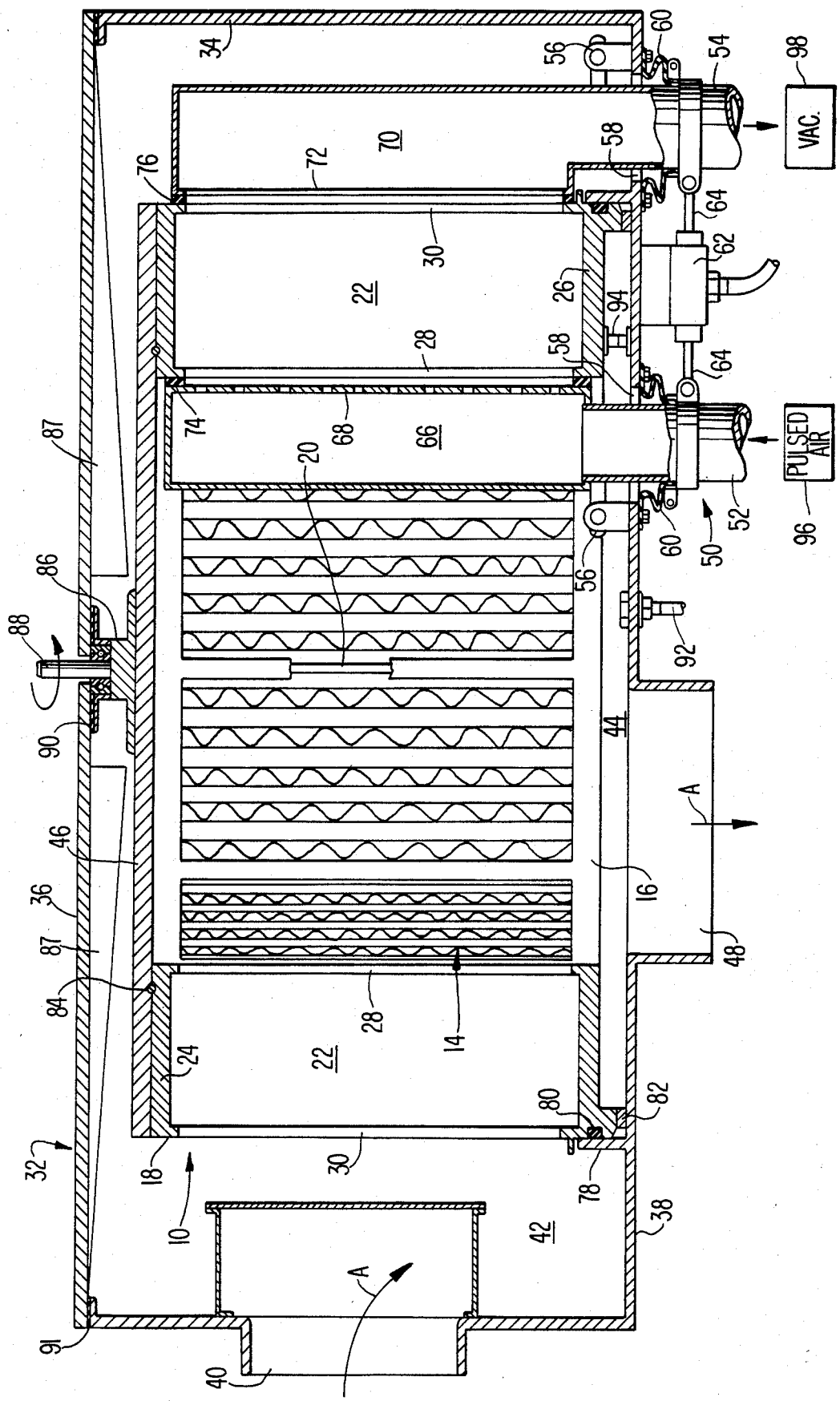
FIG. 3 is an enlarged vertical sectional view illustrating the assembly of a filter unit and a cleaning unit of the invention in a housing that provides the main flow path of fluid to be filtered.

As shown in FIG. 3, the filter unit 10 is placed in a housing 32 which defines a main flow path (indicated by arrows A) for the fluid to be filtered. In the form shown, housing 32 is also cylindrical, having a side wall 34, a top wall 36, and a bottom wall 38. A baffled inlet 40 provides air flow through the side wall 34 to an inlet region 42. Air entering the inlet region passes into openings 30 in the outer wall of the filter unit, and through the filter medium and openings 28 to an outlet region 44 inside and beneath the filter unit. The top of the filter unit is closed by a plate 46. An outlet 48 in the bottom wall of the housing is connected to the intake manifold of an engine, for example.

The filter system of the invention also comprises a cleaning unit 50 that includes a pair of ducts 52 and 54 disposed for alignment with the inner and outer openings 28 and 30, respectively, of a selected compartment 22 of the filter unit. The ducts are supported in the housing 32 by pivotal mountings 56, and extend through openings 58 in the bottom wall 38 of the housing that are sealed by bellows 60 or other flexible seals. An actuator 62 is mounted on the bottom wall of the housing and is pivotally coupled to the ducts 52 and 54 by linkages 64. The actuator may comprise a pair of pistons (operated electrically, pneumatically, or hydraulically, for example) which are effective to tilt the ducts 52 and 54 toward or away from a selected compartment 22 in unison.

Duct 52 terminates in a chamber 66 having a perforated wall 68 adapted to be aligned with an opening 28 of a selected compartment 22 of the filter unit. Duct 54 terminates in a chamber 70 having an opening 72 at one side thereof adapted to be aligned with an opening 30 of the selected compartment. The chambers 66 and 70 have gaskets 74 and 76 that form seals about the perimeter of the openings 28 and 30, respectively.

The filter unit 10 is supported for rotation in the housing 32 about the axis of the filter unit. For this purpose, the bottom wall 38 of the housing is provided with an inwardly extending circular lip 78 which receives the filter unit, which is sealed to the lip by an O-ring 80. Bearings 82 are provided to support the filter unit on the bottom wall of the housing. Plate 46 constitutes a drive plate and is pinned or otherwise attached to the top wall 24 of the filter unit, being sealed thereto by an O-ring 84. The drive plate has a spindle assembly 86 driven by a drive shaft 88 for rotating the filter unit intermittently. Gaskets 90 and 91 are provided between the top wall 36 of the housing and the spindle assembly 86, and between the top wall 36 and the side wall 34 of the housing. The top wall of the housing is reinforced by fins 87 and is removable to permit insertion and removal of the filter unit.

In the operation of the invention, contaminated air enters the inlet 40 and passes through the filter unit for the removal of contaminants, clean air then passing through the outlet 48. The interception and retention of particulaee and aerosol contaminants from the inlet air will produce an increase in the static pressure difference across the filter medium proportional to the amount of contaminant retained and the velocity of the air through the medium. To bring the static pressure difference to a low steady-state value the filter unit is cleaned in situ. As determined by a preset static pressure difference, which may be sensed by a remote pressure switch and indicator attached to a pressure sensing port 92, for example, or as determined by a set time period cycle, a ceeaning sequence is initiated. Actuator 62 is energized so as to pivot the ducts 52 and 54 in a direction that moves the chambers 66 and 70 away from the adjacent inner and outer walls of the filter unit. Then the filter unit is rotated by turning the drive shaft 88 by means of a conventional power source (not shown) to move the filter unit to an initial indexed position relative to the cleaning unit 50, which may be sensed by a conventional proximity or detent switching device 94. Arrival of the filter unit at the initial indexed position sends a signal to the drive system to stop rotation of the filter unit. The command signal which stops rotation of the filter unit also causes the actuator 62 to pivot the ducts 52 and 54 toward the adjacent walls of the filter unit so as to seal the chambers 66 and 70 to the perimeter of corresponding openings 28 and 30 of a selected compartment 22, isolating the selected compartment, as shown diagrammatically in FIG. 2. Then pulses of a cleaning fluid, such as air, are supplied to duct 52 from a source 96, while suction is applied to duct 54 from a source 98. High pressure pulses of air through the perforated plate 68 of chamber 66 are effective to dislodge material collected by the filter medium in the selected compartment 22, and the dislodged material is delivered to duct 54 for disposal. After a predetermined cleaning interval, the actuator 62 tilts the ducts 52 and 54 away from the adjacent walls of the compartment 22; the drive system is energized to rotate the filter unit to the next indexed position; and the actuator 62 moves the ducts into sealing engagement with the openings 28 and 30 of the next selected compartment 22, so that this compartment is cleaned in the same manner as the preceding compartment.

By virtue of the invention, the filter unit is cleaned without interrupting its normal operation and before the pressure difference across the filter reaches an undesirable level.

Figure 4:
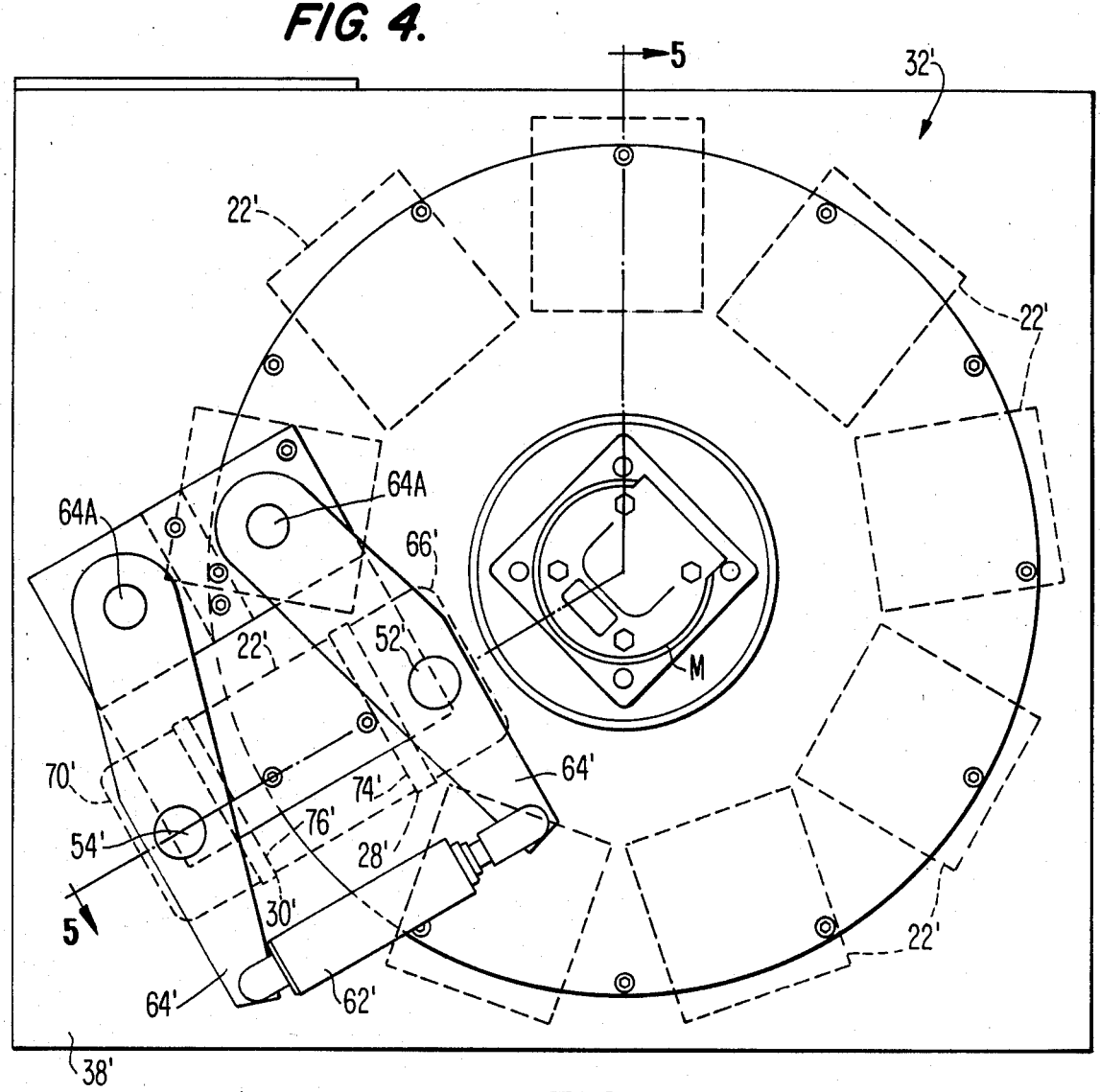
FIG. 4 is a bottom plan view of another embodiment of the invention.
Figure 5:
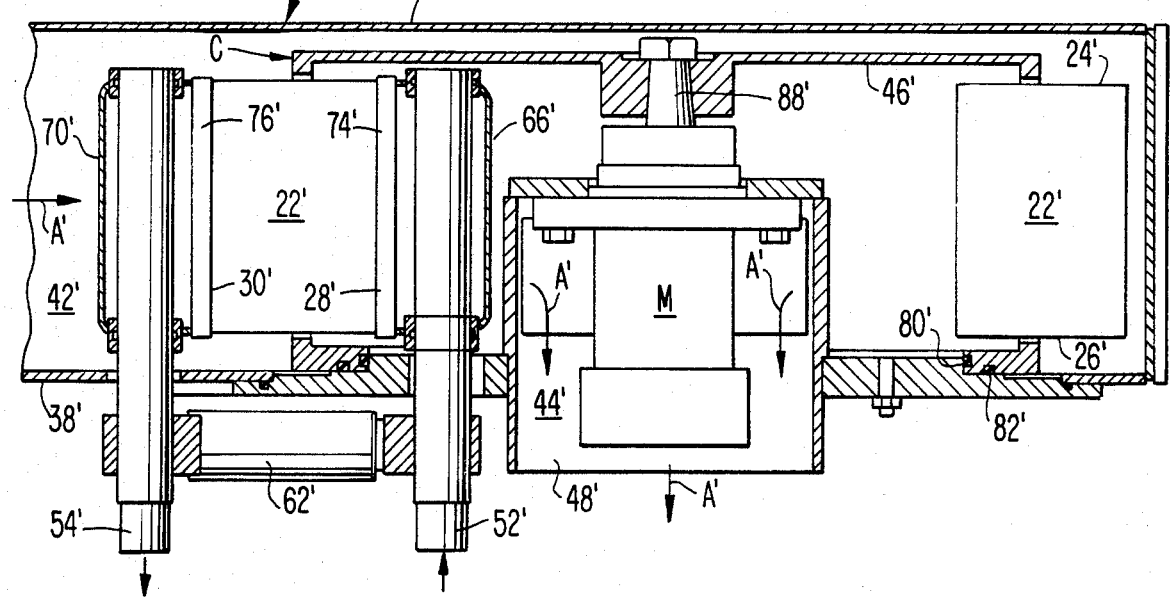
FIG. 5 is a vertical sectional view taken along line 5—5 of FIG. 4.

FIGS. 4 and 5 illustrate another embodiment of the invention, in which the compartments of the filter unit are constituted by individual, independent filter cartridges that are mounted around the perimeter of a cylindrical carousel and that may be inspected, tested, and replaced individually. This arrangement has certain advantages. In many installations, removal of a single, rather large filter assembly is difficult or impossible without removing appurtenant components, which can be time consuming and expensive. In addition, replacement of individual filter cartridges, when necessary, is generally less costly than replacement of an entire filter compartment assembly.

In FIGS. 4 and 5 parts corresponding to those previously described with respect to FIGS. 1-3 have been designated by the same reference numerals, suitably primed. The individual filter cartridges 22' are mounted on a cylindrical carousel C supported by a shaft 88' rotated by a motor M or any other means for advancing the carousel. Each cartridge 22' forms a separate fluid flow path between openings 28' and 30' of the filter cartridge. Except for these openings, the walls of each cartridge are impervious. The cartridges are arranged around the perimeter of the carousel C as shown and are removably attached to the carousel individually in a conventional manner, as by threads or resilient fasteners, for example.

Housing 32' defines a main flow path, indicated by arrows A', from an inlet region 42' to an outlet region 44'. A suitable access door (not shown) is provided in the housing so that the filter cartridges may be inspected, removed, and installed individually.

In the form shown in FIGS. 4 and 5 ducts 52' and 54' of the cleaning unit are associated with respective manifolds 66' and 70' which support the seals 74' and 76', the portions of the ducts in the respective manifolds being provided with openings (not shown) for communication with the manifolds. As shown in FIG. 4, the linkages 64' are pivoted at 64A on the bottom 38' of the housing and are moved by the actuator 62' to move the manifolds 66' and 70' toward and away from respective cartridge openings 28' and 30' in unison.

In the form shown in FIGS. 4 and 5, the carousel C (which may have an outside diameter of about 15 inches) is rotated by a hydraulic motor M (such as a Gerotor). Rotation of the carousel is controlled by means of electrical limit switches operated by a series of cams, one at each cartridge location, and a control logic circuit. Alternatively, the carousel may be rotated by means of a known linear actuator indexing mechanism (not shown). With such a mechanism, at the start of a self-cleaning cycle, a gripper block would be drawn back by an air cylinder and then pushed forward. A spring loaded pawl would then engage one of a series of circumferentially spaced pins on the carousel, which would index around until it meets a spring loaded positive stop. The carousel would be held in position while the cleaning manifolds close on the air filter and the cleaning operation takes place. When this is complete the cleaning manifolds would open and the gripper block would retract and then engage the next pin on the carousel.

The filter cartridge to air pulse and vacuum manifold interfaces are sealed by molded gaskets to ensure maximum efficiency. All joints in the housing are sealed with rubber gaskets or boots to ensure that no leakage of unfiltered air is permitted to penetrate directly into an engine inlet. At the interface between the rotating carousel and the housing, dynamic Teflon lip and or face seals are employed.

When the filter cartridges require cleaning, as indicated by the static pressure differential across the barrier filter medium of the cartridges, a manual initiation of cleaning is performed. Once initiated, cleaning is accomplished automatically in the following manner. The carousel is rotated and stopped when every second filter cartridge reaches the cleaning station. The double spacing in conjunction with an odd total number of cartridges provides a more even distribution of clean and dirty filter cartridges around the carousel. The logic unit and cam-operated limit switches, one for each cartridge, ensure precise locating of each cartridge at the cleaning station. (Alternatively, the aforementioned linear actuator mechanism may perform this function.) After a short delay, the pivoting manifolds for the air pulse and the cleaning vacuum swing in to seal against the aligned filter cartridge end faces. The air pulse and cleaning vacuum then dislodge and remove collected contaminants. A predetermined number of pulsing air blasts may be applied during a period less than 50 seconds, for example, after which the air pulse and vacuum systems are turned off. The two manifolds then pivot away from the cleaned cartridge, and the carousel rotates to position the next cartridge to be cleaned at the cleaning station. The cleaning operation proceeds continuously until it is deactivated, as by the operation of a manual switch. Alternatively, the logic unit may be programmed to turn the system on and off in accordance with any desired schedule.

In one embodiment of the invention, 5 to 8 SCF of air is released during each individual air pulse. A total of 4 or 5 pulses per cartridge cleaning cycle is used, the air being supplied by a blower or compressor having a capability of 25 to 40 SCFM at 35 PSIG. An accumulator storage capacity of approximately 5 SCF may be used. The vacuum system operates in the range of 15 to 25 inches water gage and with sufficient volumetric capacity to accommodate the instantaneous pulsed air volume. A 5 to 10% scavenge air volume relative to an engine inlet demand may be employed.

The filter systems of the invention rely upon total isolation of a filter compartment being cleaned from the main flow path. This not only permits continuous operation of the filter system in a normal manner, but also permits the concentration and maximum utilization of air pulses and vacuum to ensure thorough cleaning while reducing the power requirements of the pulse air and vacuum systems. With a relatively small portion of the filter isolated for cleaning, the air pulses (or other cleaning fluid flow) can be efficiently utilized to mechanically shake the filter medium vigorously, which levitates the collected particulate, and the vacuum can be efficiently utilized to carry the levitated particulate to a disposal point. The invention is especially useful in environments where it is necessary to remove submicron particles deeply embedded in a mat of filter medium fibers, such as fiberglass strands one to several microns thick matted to form a total filter sheet thickness of about 30 thousandths of an inch thick, or in an expanded Teflon filter membrane, for example.

While preferred embodiments of the invention have been shown and described, it will be apparent to those skilled in the art that changes can be made without departing from the principles and spirit of the invention, the scope of which is defined in the appended claims.

The invention claimed is:

1. A filter system comprising a filter unit and a cleaning unit, said filter unit including a series of compartments, each compartment defining a fluid flow path between a pair of spaced compartment openings, the flow path of each compartment being separate from the flow paths of the other compartments, said cleaning unit being disposed for selective alignment with each compartment of said filter unit, including a pair of ducts disposed for communication with the openings, respectively, of a selected compartment, having means for moving said ducts toward and away from respective openings of a selected compartment aligned with said cleaning unit, having means for forming a seal around the perimeter of the respective openings, and having means for causing cleaning fluid to flow from one of said ducts through the selected compartment to the other of said ducts, and means for causing relative movement between said filter unit and said cleaning unit to align said cleaning unit with different compartments of said filter unit 2. A system in accordance with claim 1 wherein said filter unit is cylindrical, and wherein said means for causing relative movement between said filter unit and said cleaning unit comprises means for rotating one of said units relative to the other about a central axis of said cylindrical filter unit.

3. A system in accordance with claim 2, wherein said units are mounted in a housing and said filter unit is rotatable about said axis in said housing, and wherein said housing has means defining a main flow path including the flow paths of each of said compartments, the selected compartment of said filter unit being cleaned by said cleaning unit being isolated from said main flow path.

4. A system in accordance with claim 3, wherein said main flow path includes a fluid inlet region and a fluid outlet region of said filter unit, one of said ducts being located at said inlet region and the other of said ducts being located at said outlet region, and wherein said means for causing cleaning fluid to flow comprises means for applying pulses of cleaning fluid to the duct at the outlet region and means for applying suction to the duct at the inlet region.

5. A system in accordance with claim 1, wherein said units are mounted in a housing having means defining a main flow path between an inlet region of said filter unit and an outlet region of said filter unit, the selected compartment of said filter unit being cleaned by said cleaning unit being isolated from said main flow path.

6. A system in accordance with claim 5, wherein one of said ducts is located at said inlet region and the other of said ducts is located at said outlet region, and wherein said means for causing cleaning fluid to flow comprises means for applying pulses of cleaning fluid to the duct at the outlet region and means for applying suction to the duct at the inlet region.

7. A system in accordance with claim 1, wherein said compartments are part of a single cylindrical filter unit.

8. A system in accordance with claim 1, wherein said compartments are individual filter cartridges that are independent of each other.

9. A system in accordance with claim 8, wherein said filter unit includes a cylindrical carousel removably supporting said cartridges around its perimeter individually.

* * * * *